(No Model.)

G. L. FISK.
EAVES TROUGH ATTACHMENT.

No. 493,697. Patented Mar. 21, 1893.

Witnesses
Edwin L. Bradford
Frank H. Thatcher

Inventor
George L. Fisk
By Patrick O'Farrell
Attorney

UNITED STATES PATENT OFFICE.

GEORGE L. FISK, OF ELLISVILLE, ILLINOIS.

EAVES-TROUGH ATTACHMENT.

SPECIFICATION forming part of Letters Patent No. 493,697, dated March 21, 1893.

Application filed October 7, 1891. Serial No. 408,050. (No model.)

*To all whom it may concern:*

Be it known that I, GEORGE L. FISK, a citizen of the United States of America, residing at Ellisville, in the county of Fulton and State of Illinois, have invented certain new and useful Improvements in Eaves-Trough Attachments, of which the following is a specification, reference being had therein to the accompanying drawings.

My invention relates to improvements in eaves-troughs; and consists in providing the opening leading from the trough to the drain pipe with a suitable attachment to prevent leaves and other accumulations in said trough from entering the pipe, and it further consists in providing means for removing such accumulations from the trough.

Figure 1:
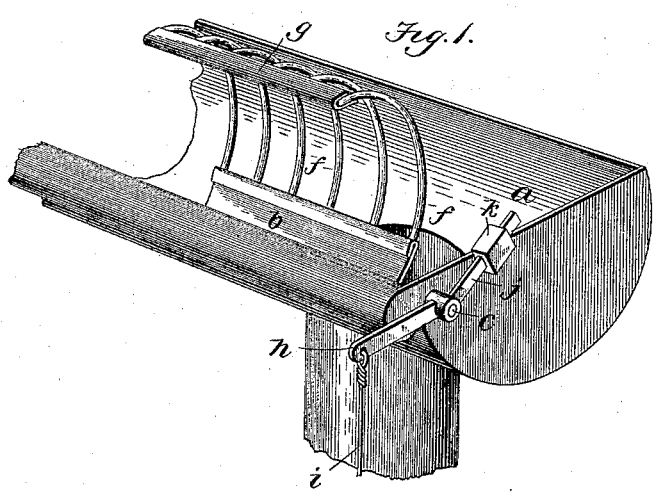
Figure 2:
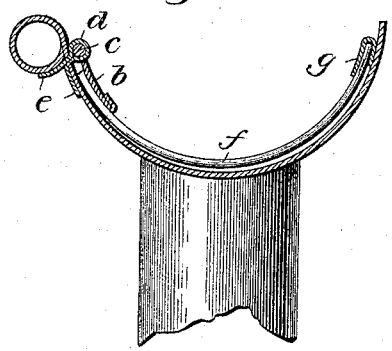

In the accompanying drawings: Figure 1 is a perspective showing a portion of an eaves-trough with my improvement attached. Fig. 2 is an end view showing the position of the trap when in normal position.

In the drawings $a$ represents an eaves-trough of the usual form, with drainage pipe attached, on the inside of the trough and immediately over the mouth of the pipe I place the trap formed in the present instance of the metal plates $b\ g$, connected by bent wires or rods $f$ that have the same curvature as the inside of the trough, the plate $b$ is rigidly attached to a rod $c$ which extends through the end of the trough and has the counterpoised lever $j$ attached to it, the trap is secured to the trough by the hinge $e$ shown in Fig. 2, and the journal of the rod in the end of the trough, or by other appropriate means, to one end of the lever a cord or rod $i$ is attached at $h$ and to the other end the counterpoise $k$, which keeps the trap normally shut down over the mouth of the drain pipe as shown in Fig. 2, thus preventing leaves and other accumulations that gather in the trough, from being carried into the pipe and choking it, and when the trough becomes obstructed it may be cleaned by pulling the rod $i$ which operating through the shaft $c$ causes the trap to discharge any accumulations over the edge of the trough, when the rod $i$ is released the counterpoise $k$ will again seat the trap. The rod $i$ may be made of any convenient length so that the trap can be operated from the ground, or from a door or window.

The trap may be made of any convenient length, or be constructed of any suitable material, and may be made as herein illustrated or of wire gauze, perforated metal or the like.

Having thus described my invention, what I claim as new, and desire to secure by Letters Patent, is—

1. The combination of the eaves-trough and drainage pipe with the pivoted trap located within the trough and over the entrance to the pipe and means for operating the same to discharge the accumulations and to re-set the trap, substantially as described.

2. The combination of the trough, pipe and trap, with the lever and cord for operating the trap from the ground, substantially as described.

In testimony whereof I affix my signature in presence of two witnesses.

GEORGE L. FISK.

Witnesses:
 DANIEL B. SMITH,
 MATTHEW H. MITCHELL.